(12) United States Patent
Achiwa et al.

(10) Patent No.: US 9,731,803 B2
(45) Date of Patent: *Aug. 15, 2017

(54) OUTBOARD MOTOR

(71) Applicant: SUZUKI MOTOR CORPORATION, Hamamatsu-shi, Shizuoka (JP)

(72) Inventors: Tetsushi Achiwa, Hamamatsu (JP); Keisuke Daikoku, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,265

(22) Filed: Mar. 1, 2016

(65) Prior Publication Data

US 2016/0176492 A1    Jun. 23, 2016

Related U.S. Application Data

(63) Continuation of application No. PCT/JP2015/061645, filed on Apr. 15, 2015.

(30) Foreign Application Priority Data

Apr. 16, 2014   (JP) ................. 2014-084897

(51) Int. Cl.
*B63H 20/14*   (2006.01)
*B63H 23/00*   (2006.01)
(Continued)

(52) U.S. Cl.
CPC .......... *B63H 20/14* (2013.01); *B63H 20/002* (2013.01); *B63H 20/20* (2013.01); *B63H 20/28* (2013.01); *B63H 23/30* (2013.01); *F16H 3/14* (2013.01)

(58) Field of Classification Search
CPC ...... B63H 20/14; B63H 20/20; B63H 20/002; B63H 23/30; B63H 20/28; B63H 20/00; B63H 23/04; B63H 23/08; F16H 3/14
See application file for complete search history.

(56) References Cited

U.S. PATENT DOCUMENTS 3,492,966 A  *  2/1970  Kiekhaefer ............ B63H 21/28
                                                          440/75
4,343,612 A  *  8/1982  Blanchard .............. B63H 21/28
                                                          440/75
(Continued)

FOREIGN PATENT DOCUMENTS

CA          2468315 A1    11/2004
JP       H06221382 A       8/1994
(Continued)

OTHER PUBLICATIONS

International Search Report Translation mailed Jul. 7, 2015 issued in International Application No. PCT/JP2015/061645.

(Continued)

*Primary Examiner* — Anthony Wiest
(74) *Attorney, Agent, or Firm* — Troutman Sanders LLP

(57) ABSTRACT

A forward/backward switching mechanism having an intermediate gear supported by an intermediate shaft perpendicular to a drive shaft is interposed between first and second input shafts. A clutch body is a dog clutch having upper and lower locking dogs. As the dog clutch moves along an axial direction of the second input shaft and is engaged with upper or lower gears, rotation of the first input shaft is forwardly or reversely transmitted to the second input shaft.

8 Claims, 10 Drawing Sheets

(51) Int. Cl.
  *B63H 23/30* (2006.01)
  *B63H 20/28* (2006.01)
  *F16H 3/14* (2006.01)
  *B63H 20/00* (2006.01)
  *B63H 20/20* (2006.01)

(56) References Cited

U.S. PATENT DOCUMENTS

| | | | | |
|---|---|---|---|---|
| 5,009,621 | A * | 4/1991 | Bankstahl | B63H 5/10 416/129 |
| 5,309,782 | A | 5/1994 | Seaman | |
| 5,403,218 | A * | 4/1995 | Onoue | B63H 20/002 192/48.91 |
| 5,766,047 | A * | 6/1998 | Alexander, Jr. | B63H 5/10 416/129 |
| 5,791,950 | A * | 8/1998 | Weronke | B63H 5/10 440/75 |
| 7,621,792 | B2 * | 11/2009 | Fukuoka | B63H 20/245 440/89 R |
| 7,704,183 | B2 * | 4/2010 | Nakamura | B63H 5/10 440/80 |
| 2007/0287338 | A1 | 12/2007 | Miyata et al. | |
| 2009/0203491 | A1 * | 8/2009 | Okabe | B63H 23/08 475/331 |
| 2012/0045950 | A1 | 2/2012 | Huguet Casali | |

FOREIGN PATENT DOCUMENTS

| | | |
|---|---|---|
| JP | 2004351947 A | 12/2004 |
| JP | 2007315496 A | 12/2007 |
| JP | 2013516348 A | 5/2013 |
| JP | 2014172451 A | 9/2014 |
| JP | 2015098908 A | 5/2015 |

OTHER PUBLICATIONS

International Preliminary Report on Patentability and Written Opinion mailed Oct. 18, 2016 issued in International Application No. PCT/JP2015/061645.

* cited by examiner

OUTBOARD MOTOR

CROSS-REFERENCE TO RELATED APPLICATIONS

This application is a continuation application of International Application PCT/JP2015/061645 filed on Apr. 15, 2015 and designated the U.S., which claims the benefit of priority of the prior Japanese Patent Application No. 2014-084897, filed on Apr. 16, 2014, the entire contents of which are incorporated herein by reference.

TECHNICAL FIELD

The present invention relates to an outboard motor, and more particularly, to a shift unit arranged inside a lower unit and accessories thereof.

BACKGROUND ART

A mechanical device provided with a power transmission mechanism for transmitting a rotational torque has a clutch or a transmission in the middle of its power transmission path. Connection or disconnection of power is controlled, or a rotation speed or direction is suitably set on the basis of a characteristic of such a mechanical device.

In the prior art, for example, as discussed in Patent Literature 1, there is known a technology in which a forward/backward switching mechanism is arranged in the middle of a power input shaft (drive side), and a frictional cone clutch is employed as a clutch of the forward/backward switching mechanism.

CITATION LIST

Patent Literature

Patent Literature 1: Japanese Laid-open Patent Publication No. 6-221382

SUMMARY OF INVENTION

Technical Problem

The friction clutch can smoothly connect power. However, in particular, in an outboard motor provided with a propeller having a smaller inertial mass than that of the engine as a power source, slippage occurs in the propeller, and advantages of the friction clutch are restricted. In addition, in particular, in the friction clutch, since a large area is necessary to transmit a torque, the size of the clutch inevitably increases. Meanwhile, if the size is reduced, it is difficult to obtain reliable power transmission performance without any change. In particular, in an outboard motor that receives a water stream resistance, it is not easy to satisfy both demands for miniaturization and an accurate operation of the clutch mechanism.

In view of the aforementioned problems, it is therefore an object of the present invention to provide an outboard motor having a shift mechanism capable of effectively implementing miniaturization and appropriate operations.

Solution to Problem

According to an aspect of the present invention, there is provided an outboard motor including: a drive shaft extending in a vertical direction to transmit engine power; a pinion bevel gear installed in a lower end of the drive shaft to rotate in synchronization; a driven bevel gear meshing with the pinion bevel gear; a propeller shaft rotatably driven by the driven bevel gear; and a propeller installed in a rear end of the propeller shaft to rotate in synchronization, wherein the drive shaft includes a first input shaft rotated by an engine, and a second input shaft arranged coaxially with the first input shaft to receive rotation transmitted from the first input shaft, a forward/backward switching mechanism is interposed between the first and second input shafts, the forward/backward switching mechanism including a clutch body supported to rotate in synchronization with the second input shaft, an upper gear rotated by the first input shaft, a lower gear rotated reversely to the upper gear, an intermediate gear interposed between the upper and lower gears and supported by an intermediate shaft perpendicular to the drive shaft is interposed between the first and second input shafts, the clutch body is a dog clutch having upper and lower locking dogs and moving along an axial direction of the second input shaft, so that rotation of the first input shaft is transmitted to the second input shaft forwardly or reversely.

In the outboard motor described above, the forward/backward switching mechanism may be arranged under upper and lower mount portions for holding upper and lower ends of the steering shaft that supports the outboard motor pivotably to the left or the right, and at least the lower gear may be arranged over a cavitation plate provided in an upper part of the lower unit.

In the outboard motor described above, a shift actuating unit of the forward/backward switching mechanism for moving the dog clutch upward or downward may arranged in front of the drive shaft, the intermediate gear and the intermediate shaft may be arranged in rear of the drive shaft, and an accessory of the outboard motor may be driven by the intermediate shaft.

In the outboard motor described above, the accessory may include any one or both of a coolant pump for cooling the engine and a lubricant pump of the forward/backward switching mechanism.

In the outboard motor described above, the lubricant pump is arranged in front of the coolant pump.

Advantageous Effects of Invention

According to the present invention, the forward/backward switching mechanism is arranged inside the drive shaft housing, and only a propeller driving device is included in the gear casing of the lower unit. As a result, it is possible to miniaturize the lower unit and reduce a water stream resistance during a travel. In addition, since the switching between forward and backward operations is performed by using the dog clutch, it is possible to obtain a simple and light-weight mechanism, compared to a friction clutch which has a large size and a heavy weight.

DESCRIPTION OF EMBODIMENTS

A description will now be made for an outboard motor according to an embodiment of the present invention with reference to the accompanying drawings. According to an embodiment of the present invention, an outboard motor typically having contra-rotating propellers will be described by way of example. It is noted that, in each drawing, an arrow "Fr" denotes a front side of the outboard motor, an arrow "Rr" denotes a rear side, an arrow "R" denotes a right side, an arrow "L" denotes a left side, an arrow "Up" denotes an upper side, and an arrow "Dn" denotes a lower side.

<Entire Configuration of Outboard Motor>

Figure 1:
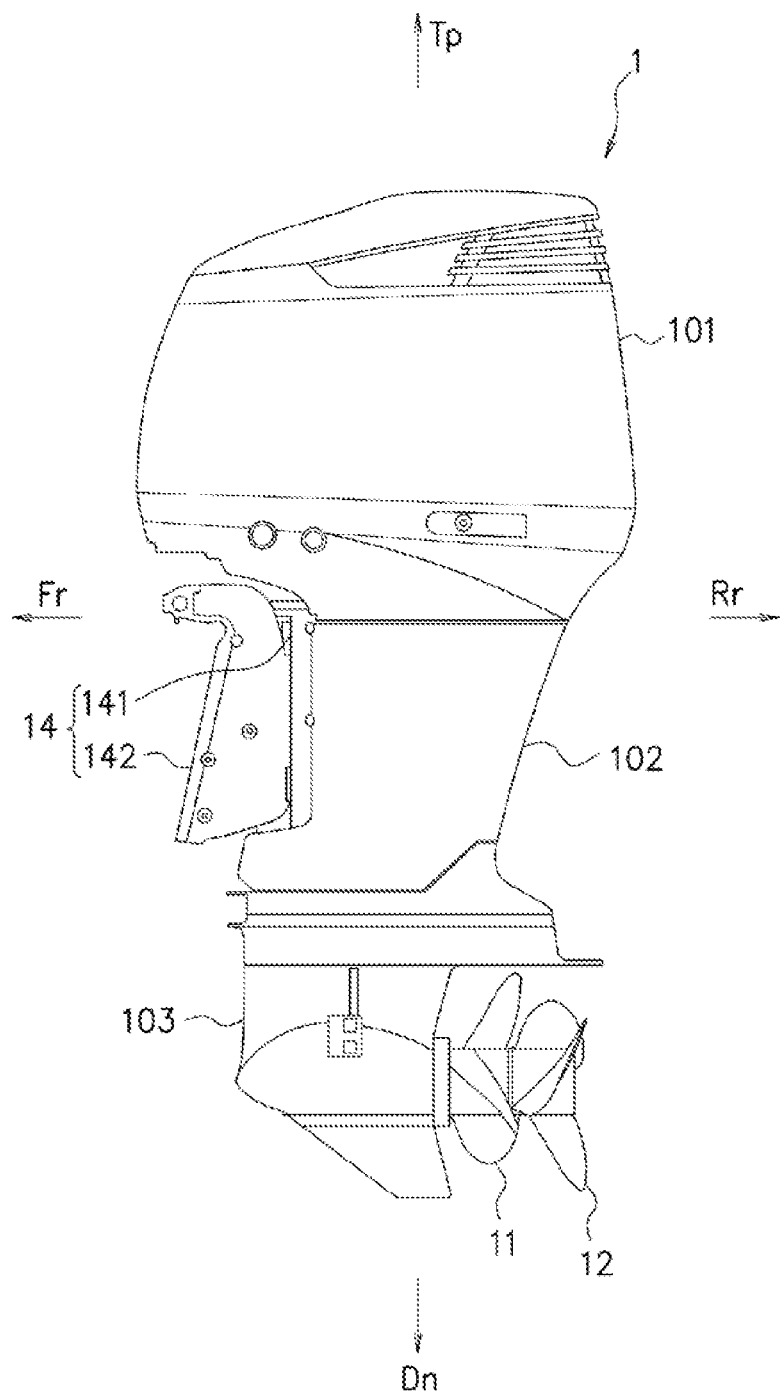
FIG. 1 is a left side view schematically illustrating an exemplary external configuration of an outboard motor.
Figure 2:
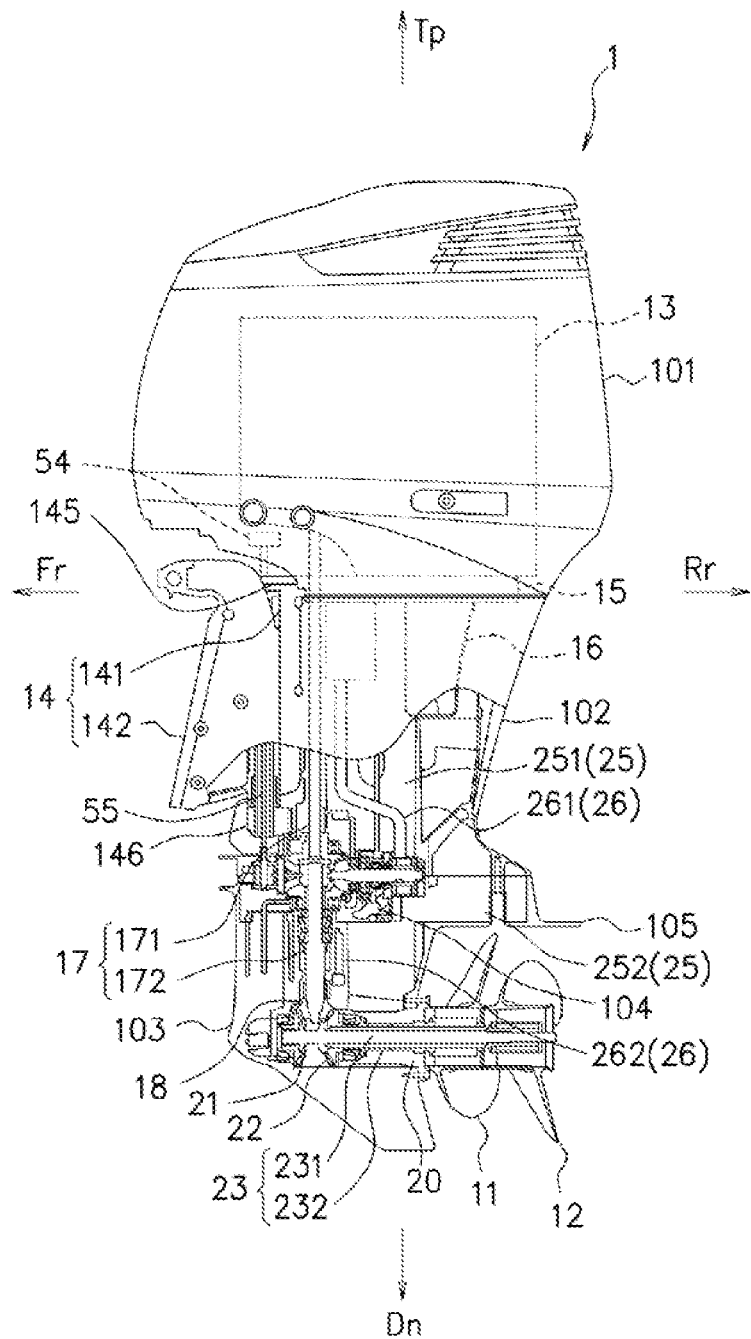
FIG. 2 is a partially cross-sectional view schematically illustrating an exemplary configuration of the outboard motor.
Figure 3:
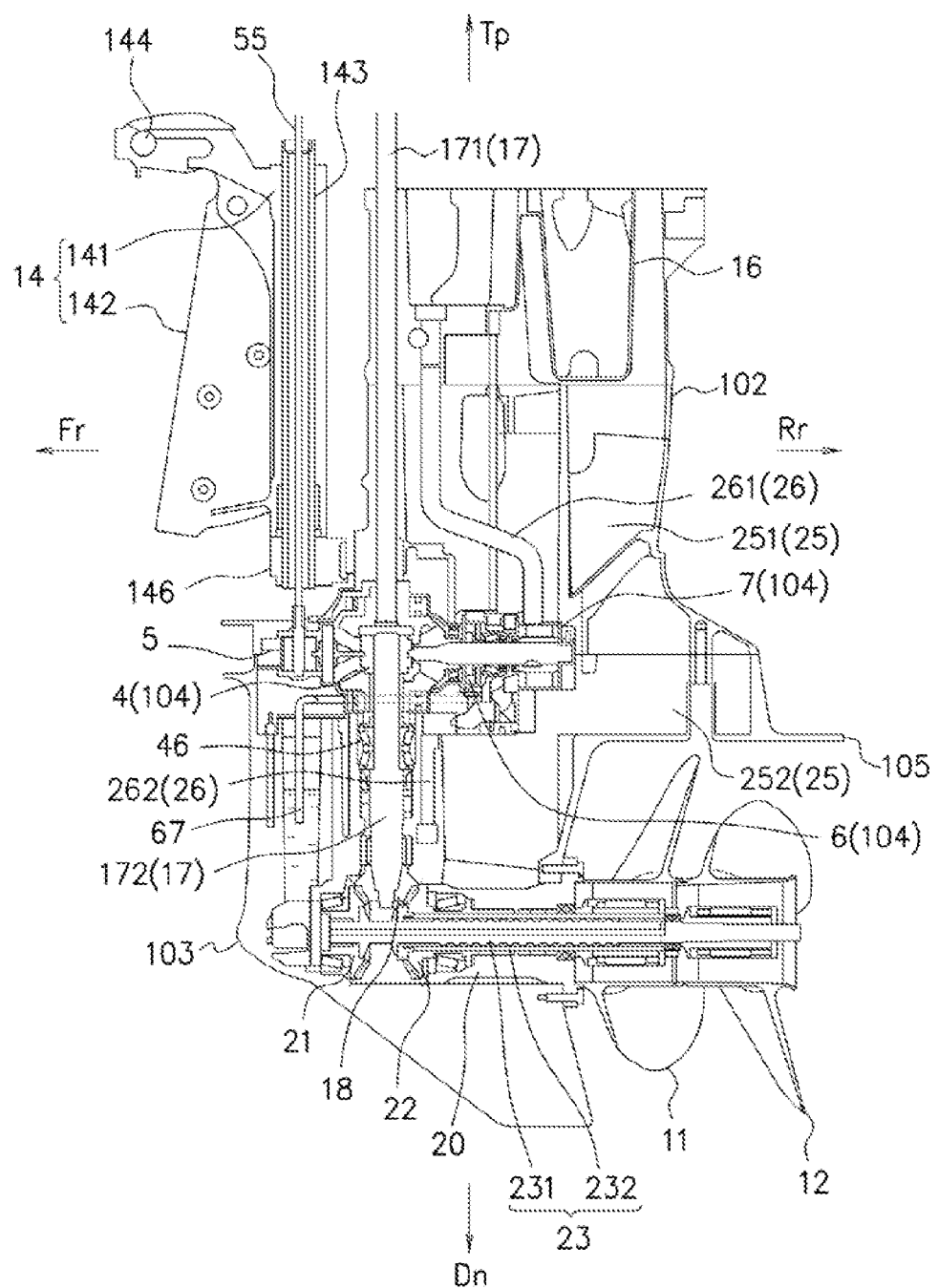
FIG. 3 is an enlarged cross-sectional view illustrating an exemplary internal configuration of a lower part of the outboard motor.

A description will be made for an exemplary entire configuration of the outboard motor 1 with reference to FIGS. 1 to 3. FIG. 1 is a left side view schematically illustrating an exemplary configuration of the outboard motor 1. FIG. 2 is a partially cross-sectional view schematically illustrating an exemplary configuration of the outboard motor 1. FIG. 3 is an enlarged cross-sectional view illustrating an exemplary internal configuration of a lower part of the outboard motor 1. As illustrated in FIGS. 1 and 2, the outboard motor 1 is provided with an engine cover 101, a drive shaft housing 102, and a lower unit casing 103 sequentially from the upside, so that they constitute a housing (exterior) of a main body of the outboard motor 1. A front propeller 11 and a rear propeller 12 are arranged coaxially in rear of the lower unit casing 103. The front and rear propellers 11 and 12 are contra-rotating propellers rotating reversely to each other. According to an embodiment of the present invention, it is assumed that, as seen from the rear side, as the front propeller rotates to the right (clockwise), and the rear propeller 12 rotates to the left (counterclockwise), the outboard motor 1 advances forward. A bracket device 14 for installing the outboard motor 1 to a ship hull is provided in front of the drive shaft housing 102. The outboard motor 1 is installed to a transom or the like of a ship by using the bracket device 14.

A description will now be made for a configuration of a power transmission system of the outboard motor 1. As illustrated in FIG. 2, the outboard motor 1 includes an engine (internal combustion engine) as a driving power source, a front propeller 11, a rear propeller 12, a propeller shaft 23 rotating in synchronization with the front and rear propellers 11 and 12, a drive shaft 17 that transmits rotational power of the engine 13 to the propeller shaft 23, and a shift unit that performs control of connection/disconnection of the rotational power from the engine 13 and switching of the rotation direction. The drive shaft 17 includes first and second input shafts 171 and 172 separated from each other. The shift unit 4 performs control of connection/disconnection of rotational power and switching of the rotation direction (that is, switching of the shift position) between the first and second input shafts 171 and 172 of the drive shaft 17. The rotational power output from the engine 13 is transmitted to the front and rear propellers 11 and 12 via the first input shaft 171, the shift unit 4, the second input shaft 172, and the propeller shaft 23.

As illustrated in FIG. 2, the engine 13 is housed in the engine cover 101 while it is supported by the engine holder 15 in its upper side. The engine 13 is, for example, a vertical-shaft water-cooled engine. In this case, the engine 13 includes a cylinder head, a cylinder block, a crankcase, and the like. In addition, in the engine 13, the crankcase is positioned in the frontmost side, the cylinder block is positioned in rear of the crankcase, and the cylinder head is positioned in the rearmost side. Furthermore, an oil pan 16 is disposed under the engine holder 15.

The first input shaft 171 of the drive shaft 17 is housed in the drive shaft housing 102 such that it can be rotated in a direction extending vertically (its axial line is vertical). An upper end of the first input shaft 171 is directly or indirectly connected to the crankshaft of the engine 13, and a lower end of the first input shaft 171 is connected to the shift unit 4. In addition, the first input shaft 171 can transmit the rotational power output from the engine 13 to the shift unit 4.

The shift unit 4 is arranged across the drive shaft housing 102 and the inside of the lower unit casing 103 as seen in a side view. In rear of the shift unit 4, an oil pump 6 and a water pump 7 as examples of accessories are arranged coaxially along a front-rear direction. The oil pump 6 is actuated by the rotational power transmitted from the shift unit 4 to receive lubricating oil (hereinafter, simply referred to as "oil") inside the lower unit casing 103 through an oil inlet tube 67 and feed the oil to the inside of the shift unit 4. The water pump 7 is actuated by the rotational power transmitted from the shift unit 4 to feed the coolant to the engine 13. According to an embodiment of the present invention, the shift unit 4 also has a function of branching the rotational power transmitted from the engine 13 to the accessories in addition to the functions of connection/disconnection of the rotational power between the first and second input shafts 171 and 172 and switching of the rotation direction. In addition, the shift unit 4, the oil pump 6, and the water pump 7 are modularized to allow for an integrated assembly work. Here, the shift unit 4, the oil pump 6, and the water pump 7 constitute a "shift unit module." It is noted that the configuration of the shift unit module 104 will be described in more detail below.

Inside the lower unit casing 103, the second input shaft 172 of the drive shaft 17 is rotatably supported by a bearing 46. The second input shaft 172 is coaxial with the first input shaft 171 and is disposed under the first input shaft 171 and the shift unit 4. It is noted that the bearing 46 that supports the second input shaft 172 has a combination of reversely tapered roller bearings in order to endure a radial load and a vertical thrust load. The upper end of the second input shaft 172 is connected to the shift unit 4, and the second input shaft 172 is arranged to extend vertically downward from the shift unit 4. The lower end of the second input shaft 172 is provided with a pinion gear 18 rotating in synchronization. For example, the pinion gear 18 is splined to the lower end of the second input shaft 172. The pinion gear 18 is combined with a bevel gear.

Figure 4:
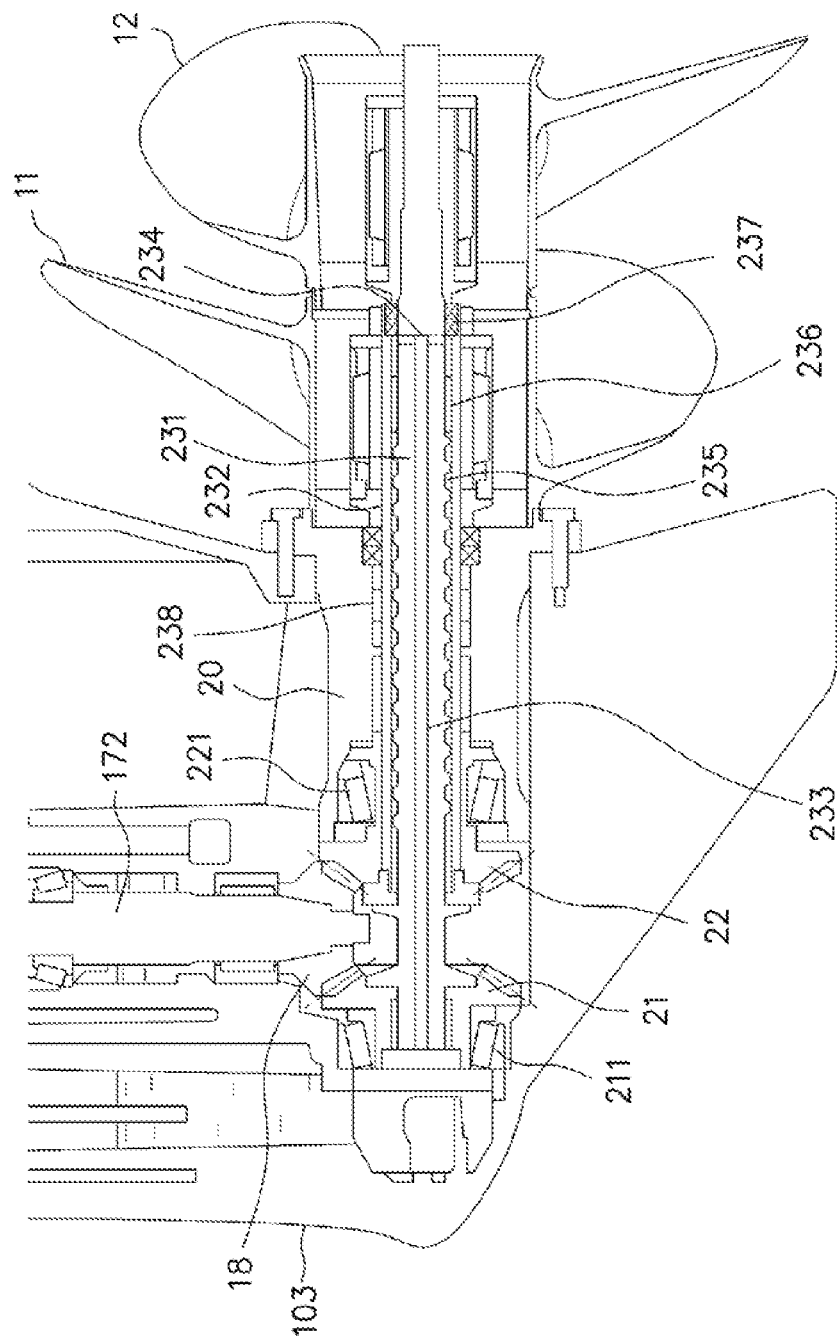
FIG. 4 is a cross-sectional view illustrating an internal structure of a lower unit casing.

Here, referring to FIG. 4 illustrating an internal structure of the lower unit casing 103, the lower unit casing 103 internally has, under the second input shaft 172, a bearing housing 20, a pair of bevel gears including front and rear gears 21 and 22, and a propeller shaft 23 arranged coaxially along the front-rear direction. The propeller shaft 23 includes an outer shaft 232 and an inner shaft 231. The bearing housing 20 is a tubular member penetrating in the front-rear direction. The bearing housing 20 is detachably fixed by using bolts and the like while it is inserted into the inside of the lower unit casing 103 from the rear side. In addition, the bearing housing 20 rotatably supports the outer shaft 232 and the rear gear 22 with the bearings 238 and 221.

The front gear 21 is arranged in front of and under the pinion gear 18 and is rotatably supported by a bearing 211 (such as a tapered roller bearing) inside the lower unit casing 103. The rear gear 22 is arranged in rear of and under the pinion gear 18 and is rotatably supported by a bearing 221 (such as a combination of a thrust needle roller bearing or a thrust cylindrical roller bearing and cylindrical roller bearing) inside the bearing housing 20. The front and rear gears 21 and 22 are arranged coaxially side by side along the front-rear direction such that its rotation center extends in the front-rear direction. In addition, the front and rear gears 21 and 22 mesh with the pinion gear 18 provided in the lower end of the second input shaft 172 at all times. For this reason, the front and rear gear 21 and 22 rotate reversely to each other by virtue of the rotational power transmitted from the second input shaft 172.

The outer shaft 232 is a hollow shaft arranged to extend in the front-rear direction. A middle portion of the longitudinal direction of the outer shaft 232 is inserted into the bearing housing 20, and the outer shaft 232 is supported by a bearing 238 (such as a needle roller baring or a cylindrical roller bearing) rotatably with respect to the bearing housing 20. The rear gear 22 is fixed to the outer circumference of the front end of the outer shaft 232 by nuts and the like. The rear end of the outer shaft 232 protrudes from the bearing housing 20 to the rear side. In addition, the front propeller 11 is provided in the rear end of the outer shaft 232 rotatably in synchronization by a shear pin and the like.

A middle portion of the longitudinal direction of the inner shaft 231 is loosely inserted into the outer shaft 232 coaxially, and the inner shaft 231 is supported by a bearing 236 (such as a needle roller bearing) rotatably with respect to the inner circumference side of the outer shaft 232. The front end of the inner shaft 231 protrudes from the outer shaft 232 to the front side and is engaged with the front gear 21 to rotate in synchronization. The rear end of the inner shaft 231 protrudes from the outer shaft 232 to the rear side. In addition, a rear propeller 12 is provided in the rear end of the inner shaft 231 rotatably in synchronization by a shear pin and the like.

In this configuration, the rotational power transmitted from the second input shaft 172 to the pinion gear 18 is transmitted to both the front and rear gears 21 and 22. In addition, the front and rear gears 21 and 22 rotate reversely. The rotational power transmitted to the front gear 21 is transmitted to the rear propeller 12 via the inner shaft 231. The rotational power transmitted to the rear gear 22 is transmitted to the front gear 11 via the outer shaft 232. Therefore, the front and rear propellers 11 and 12 rotate reversely.

It is noted that the bearing housing 20, the rear gear 22, the outer shaft 232, and the inner shaft 231 are modularized. In this modularized state, they are detachably assembled to the lower unit casing 103 by a bolt and the like.

As seen in a side view, the shift unit module 104 is arranged over the cavitation plate 105 provided in the lower unit casing 103, that is, in a position not submerged under the water during use of the outboard motor 1. In addition, as seen in a side view, the shift unit module 104 is arranged under the lower mount bracket 146 that supports the lower end of the pilot shaft 143. For this reason, in a submerged portion of the lower unit casing 103, only the propeller shaft 23 and the gear (pinion gear 18, front gear 21, and rear gear 22) for transmitting the rotational power to the propeller shaft may be provided. In this configuration, it is possible to reduce water resistance by reducing the submerged portion of the lower unit casing 103.

The bracket device 14 is provided in front of the housing of outboard motor 1 (in particular, in front of the drive shaft housing 102). The bracket device 14 has a swivel bracket 141 and a transom bracket 142. The swivel bracket 141 is connected to the front side of the main body of the outboard motor 1 rotatably in a horizontal direction (yawably). The pilot shaft 143 is fixed to the front side of the outboard motor 1 such that its axial line is in parallel with the vertical direction. For example, each of the upper and lower ends of the pilot shaft 143 is fixed to the main body of the outboard motor 1 by using upper and lower mount brackets 145 and 146. It is noted that the pilot shaft 143 has a tubular shape perforated along the axial line. The transom bracket 142 is connected to the swivel bracket 141 rotatably in a pitching direction (pitchably) with respect to a tilt shaft 144. The tilt shaft 144 is fixed to the swivel bracket 141 such that its axial line is in parallel with the left-right direction. In addition, the transom bracket 142 is provided with a clamp or the like for installation to a transom of a ship. The outboard motor 1 is installed to a transom of a ship by using the transom bracket 142 of the bracket device 14. Using the bracket device 14 having such a configuration, the outboard motor 1 becomes rotatable horizontally with respect to the pilot shaft 143 and rotatable vertically with respect to the tilt shaft 144 while the outboard motor 1 is installed in a transom and the like of a ship.

It is noted that the upper mount bracket 145 is provided with a steering bracket (not shown). A steering handle is connected to the steering bracket with a cable or the like. A ship operator performs steering of the outboard motor 1 by manipulating the steering handle. In addition, the outboard motor 1 is provided with a trim control device. This trim device can be used to rotate the outboard motor 1 in a pitching direction by using the hydraulic pressure or the like. In addition, a ship operator performs tilt or trim adjustment of the outboard motor 1 by manipulating the trim control device.

The outboard motor 1 is further provided with an exhaust passage 25 that guides an exhaust gas of the engine 13 to the outside of the outboard motor 1 and a coolant passage 26 that guides coolant to the engine 13.

The exhaust passage 25 includes an upper exhaust passage 251 formed in a rear side of the first input shaft 171 inside the drive shaft housing 102 and a lower exhaust passage 252 formed in a rear side of the shift unit module 104 inside the lower unit casing 103. The upper exhaust passage 251 communicates with an exhaust port (not shown) of the engine 13. The lower exhaust passage 252 communicates with an exhaust duct, for example, formed in the lower surface of the cavitation plate 105. In addition, as the lower unit casing 103 is installed to the drive shaft housing 102, the upper and lower exhaust passages 251 and 252 communicate with each other integratedly. For this reason, an exhaust gas of the engine 13 is discharged to the outside of the outboard motor 1 through the upper and lower exhaust passages 251 and 252 and the exhaust duct.

The coolant passage 26 includes a lower coolant passage 262 formed inside the lower unit casing 103 and an upper coolant passage 261 provided inside the drive shaft housing 102. The lower coolant passage 262 connects a water inlet port of the lower unit casing 103 and a coolant intake port 721 of the water pump 7 to each other. The upper coolant passage 261 connects a coolant discharge port 711 of the water pump 7 and the engine 13 (more specifically, a water jacket of the engine 13) to each other. As illustrated in FIGS. 2 and 3, the upper coolant passage 261 may be a pipeline. In this configuration, the water pump 7 can receive coolant through the water inlet port and the lower coolant passage 262 and supply the received coolant to the engine 13.

<Lubrication of Bearing that Rotatably Supports Inner Shaft>

Next, a description will be made for a configuration for lubricating the bearing 236 that rotatably supports the inner shaft 231. Oil is retained in the lower unit casing 103. In addition, the lower end of the second input shaft 172, the pinion gear 18, the front gear 21, the rear gear 22, the inner shaft 231, and the outer shaft 232 are immersed in the oil. For this reason, these members and bearings 211, 221, 236, and 238 that rotatably support these members are lubricated by the oil retained in the lower unit casing 103. Meanwhile, since the bearing 236 that rotatably supports the inner shaft 231 is provided in a gap between the outer shaft 232 and the inner shaft 231, the oil may be accumulated around the bearing 236, so that deterioration may occur easily. For this reason, lubrication of the bearing 236 may become insufficient in this state, and overheating or the like may occur. In this regard, according to an embodiment of the present invention, the bearing 236 is lubricated by circulating oil based on the following configuration.

A gap is formed between the outer circumferential surface of the inner shaft 231 and the inner circumferential surface of the outer shaft 232. This gap serves as an oil circulation passage for circulating oil. In the rear side of the bearing 236 that supports the inner shaft 231, which is the rear end of the outer shaft 232, an oil seal 237 for preventing leakage of the oil from this gap to the rear side is mounted. Inside the inner shaft 231, an oil circulation orifice 233 serving as an oil circulation passage is formed. This oil circulation orifice 233 is formed to extend in an axial line of the inner shaft 231 along an axial center of the inner shaft 231. The front end of the oil circulation orifice 233 is exposed and opened to the front end surface of the inner shaft 231. The rear end of the oil circulation orifice 233 is positioned between the bearing 236 that supports the inner shaft 231 and the oil seal 237 as seen in a side view. In addition, an oil outlet hole 234 that causes the oil to flow between the rear end of the oil circulation orifice 233 and the outer circumference of the inner shaft 231 is formed between the bearing 236 that supports the inner shaft 231 and the oil seal 237. Furthermore, a spiral trench 235 for sending the oil from the rear side to the front side is formed in the outer circumferential surface of the inner shaft 231 across a range from the vicinity of the rear side of the rear gear 22 to the vicinity of the front side of the bearing 236.

As the inner shaft 231 is rotated by virtue of the rotational power transmitted from the engine 13, the oil inside the oil outlet hole 234 flows to the space between the inner circumferential surface of the outer shaft 232 and the outer circumferential surface of the inner shaft 231 by virtue of a centrifugal force caused by the rotation of the inner shaft 231. In addition, the resulting oil flows to the front side by the oil subsequently flowing from the oil outlet hole 234. Furthermore, since the spiral trench 235 is formed in the outer circumferential surface of the inner shaft 231, the oil is also sent to the front side by virtue of the rotation of the spiral trench 235. As the oil flows from the oil outlet hole 234, the inside of the oil circulation orifice 233 has a negative pressure. Therefore, the oil flows from the front end of the inner shaft 231 to the oil circulation orifice 233. In this manner, it is possible to improve an oil circulation effect by combining the oil circulation orifice 233 and the spiral trench 235. As a result, while the inner shaft 231 is rotated, it is possible to circulate the oil to the gap between the inner and outer shafts 231 and 232, the oil circulation orifice 233 of the inner shaft 231, and the oil outlet hole 234. For this reason, it is possible to prevent the oil from being accumulated around the bearing 236 that supports the inner shaft 231 and from being deteriorated. Therefore, it is possible to prevent a failure such as overheating of the bearing 236 that supports the inner shaft 231 and improve integrity.

It is noted that the spiral trench 235 of the outer circumference of the inner shaft 231 is formed to send the oil from the rear side to the front side when the outboard motor 1 makes a forward travel. If the outboard motor 1 makes a forward travel when the rear propeller 12 and the inner shaft 231 make a left turn as described above, the spiral trench 235 is formed in a right-handed thread manner.

Figure 5:
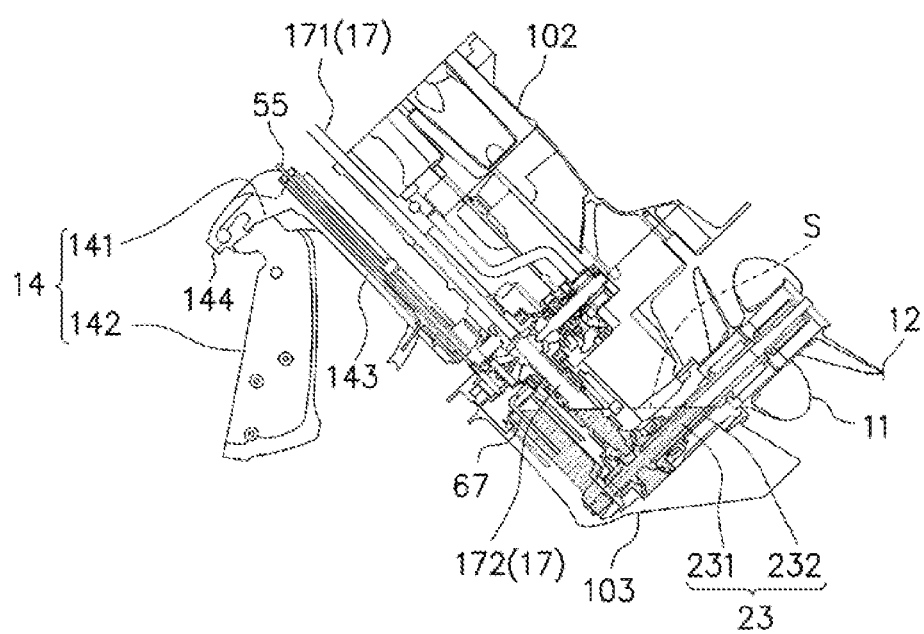
FIG. 5 is a cross-sectional view illustrating a forward tilt state of the outboard motor.

In this configuration, even when the outboard motor 1 has a front tilt posture as illustrated in FIG. 5, it is possible to lubricate the bearing 236 that supports the inner shaft 231. FIG. 5 is a cross-sectional view schematically illustrating a condition of the oil when the outboard motor 1 has a front tilt posture. As illustrated in FIG. 5, even when the outboard motor 1 has the front tilt posture, the front end of the inner shaft 231 is immersed to the oil. It is noted that, in FIG. 5, "S" denotes a surface of the oil. For this reason, as the inner shaft 231 rotates, the oil inside the oil outlet hole 234 is discharged to the gap between the outer shaft 232 and the inner shaft 231 by virtue of the centrifugal force. As a result, the inside of the oil circulation orifice 233 has a negative pressure, and the oil is pumped up through the oil circulation orifice 233. In this manner, even when the outboard motor 1 has a front tilt posture, and the bearing 236 that supports the inner shaft 231 is positioned higher than the oil surface S, it is possible to circulate the oil and feed the oil to the bearing 236 that supports the inner shaft 231.

<Configuration of Shift Unit Module>

Figure 6:
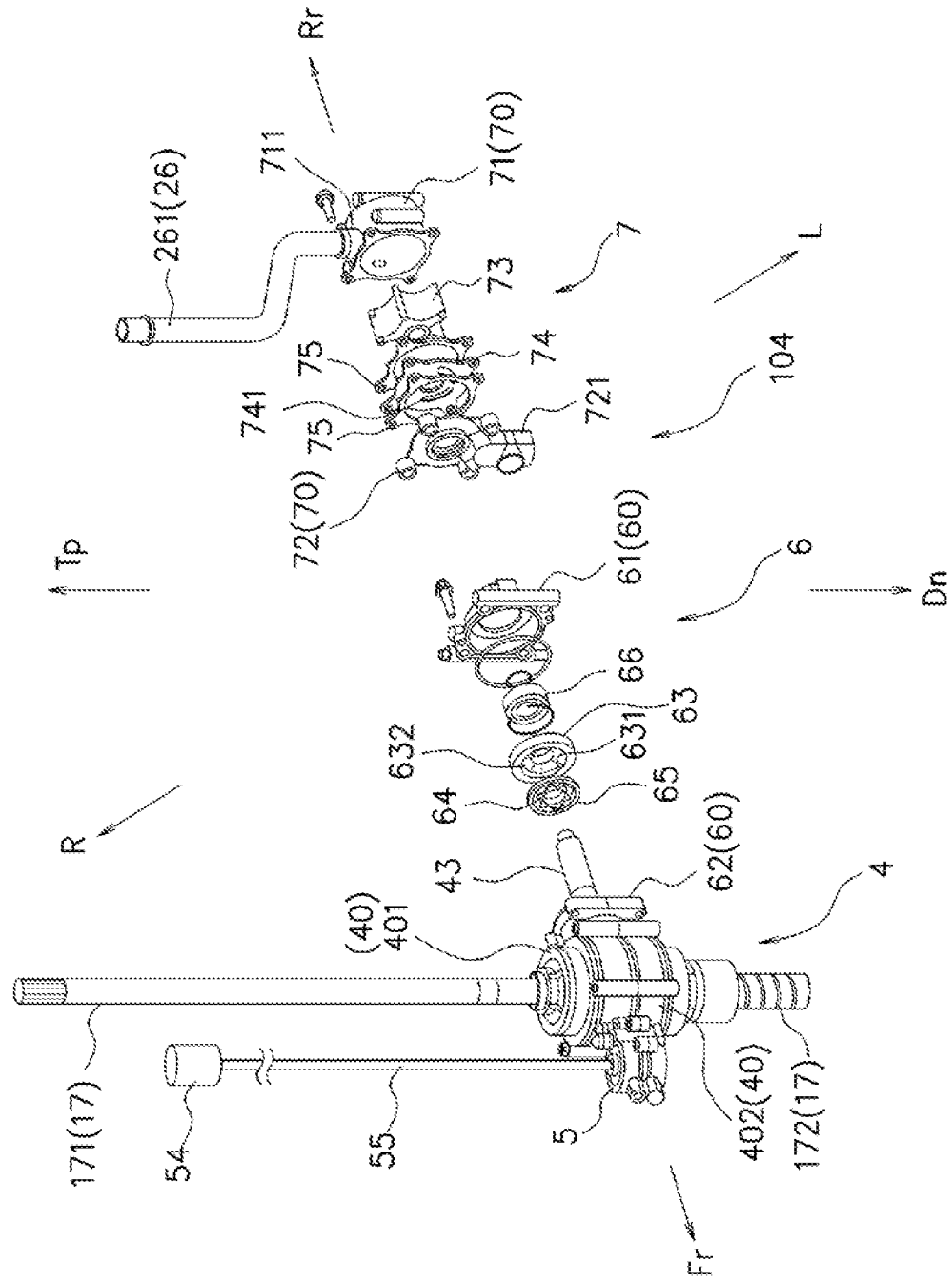
FIG. 6 is an exploded perspective view schematically illustrating an exemplary configuration of a shift unit module.
Figure 7:
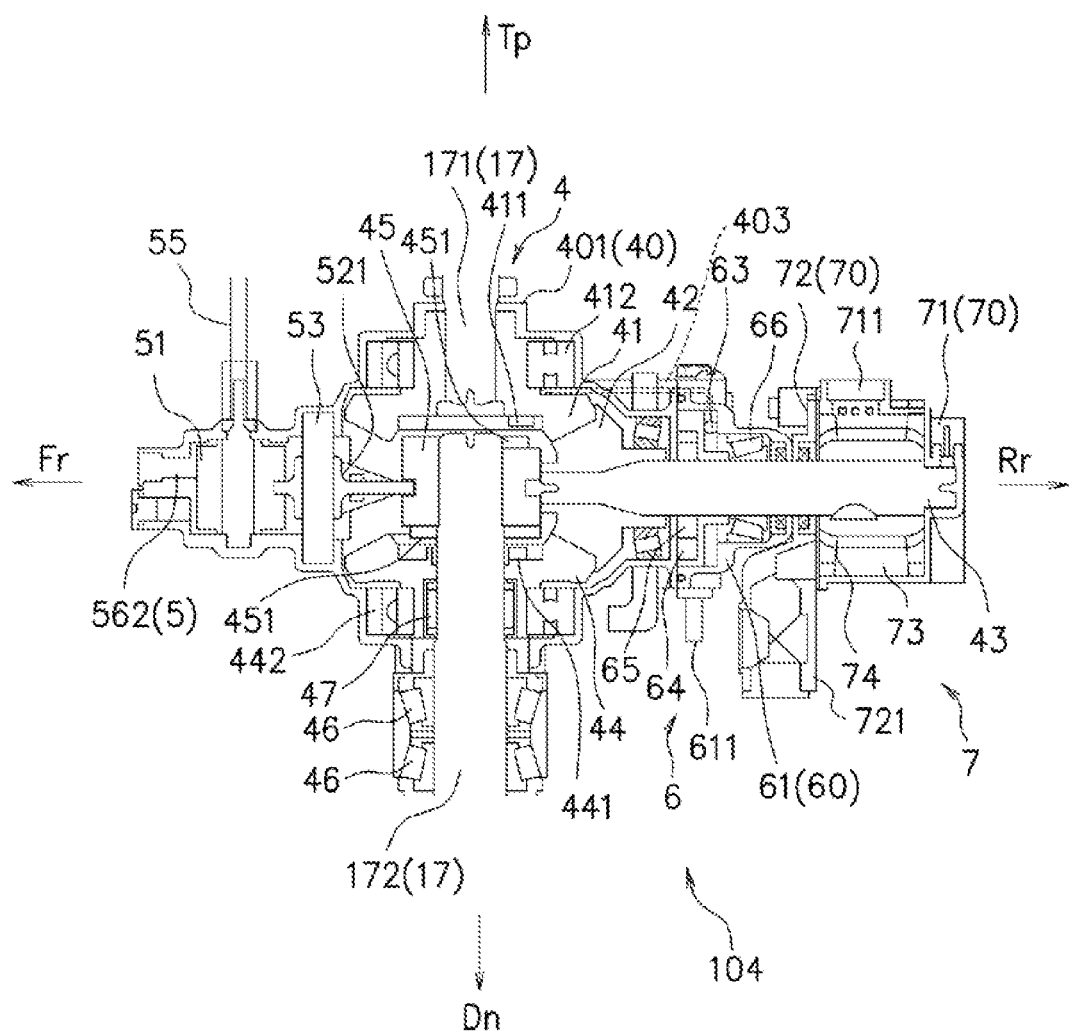
FIG. 7 is a cross-sectional view schematically illustrating an exemplary configuration of the shift unit module.
Figure 8:
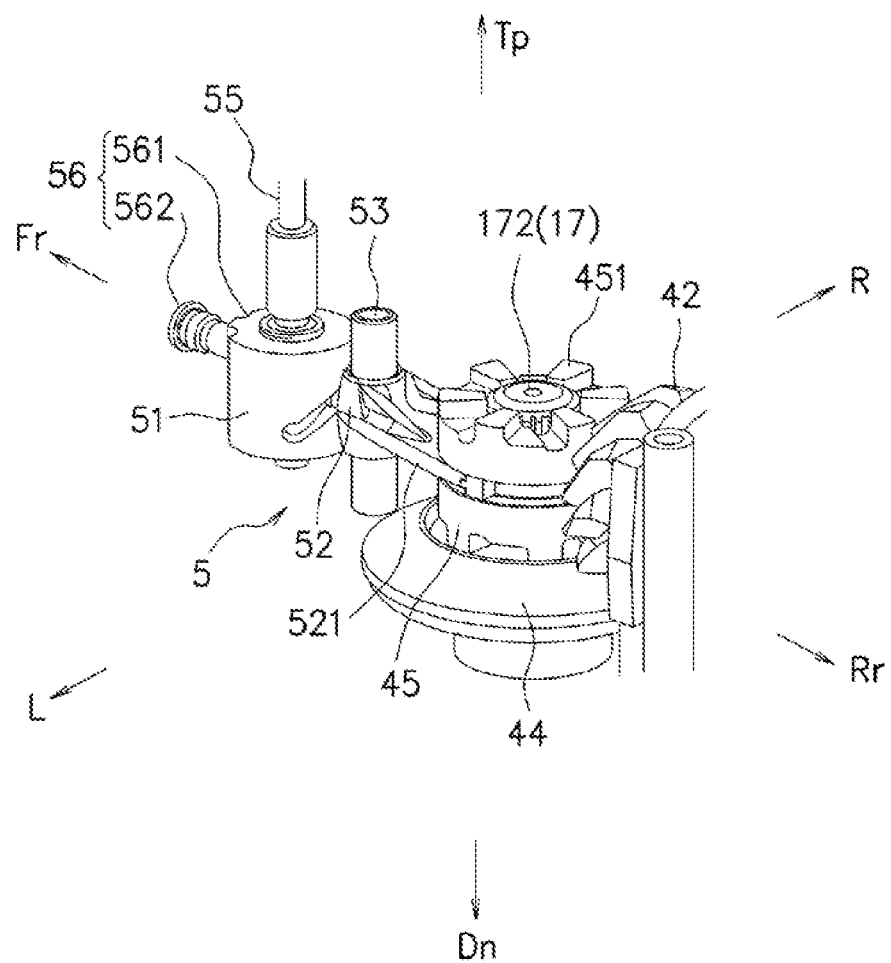
FIG. 8 is a perspective view schematically illustrating exemplary configurations of main parts of a shift actuating unit.

Next, a description will be made for a configuration of the shift unit module 104 with reference to FIGS. 6 to 8. FIG. 6 is an exploded perspective view schematically illustrating an exemplary configuration of the shift unit module 104. FIG. 7 is a cross-sectional view schematically illustrating an exemplary configuration of the shift unit module 104. FIG. 8 is a perspective view illustrating an exemplary configuration of the shift actuating unit 5 of the shift unit 4.

As illustrated in FIGS. 6 and 7, the shift unit module 104 has the shift unit 4, the oil pump 6, and the water pump 7. In addition, the oil pump 6 is arranged in rear of the shift unit 4, and the water pump 7 is arranged in rear of the oil pump 6. In addition, in the shift unit 4, the shift actuating unit 5 that performs switching of the shift position is arranged in front of the first and second input shafts 171 and 172. In this manner, the oil pump 6 and the water pump 7 as examples of accessories are coaxially arranged in the rear side, and the shift actuating unit 5 is arranged in the front side while they are interposed between the first and second input shafts 171 and 172. In addition, the shift unit module 104 is fixed to the lower unit casing 103 by a bolt and the like. For this reason, as the lower unit casing 103 is removed from the drive shaft housing 102, the shift unit module 104 is separated from the drive shaft housing 102 along with the lower unit casing 103.

In particular, as illustrated in FIG. 6, the shift unit 4, the oil pump 6, and the water pump 7 are subsidiary modules of the shift unit module 104. That is, the shift unit module 104 is obtained by individually assembling and further combining the shift unit 4, the oil pump 6, and the water pump 7.

<Shift Unit>

As illustrated in FIG. 7, the shift unit 4 includes a shift housing 40, an upper gear 41, an intermediate gear 42, a lower gear 44, and a dog clutch (clutch body), and a shift actuating unit 5.

The shift housing 40 is a housing of the shift unit 4 and has an upper half 401 and a lower half 402. The upper and lower halves 401 and 402 can be divided vertically with respect to a plane perpendicular to the axial lines of the first and second input shafts 171 and 172 as a dividing plane. The dividing plane between the upper and lower halves 401 and 402 is formed near a dividing plane between the drive shaft housing 102 and the lower unit casing 103 as seen in a side view (refer to FIGS. 2 and 3). In addition, the dividing plane between the upper and lower halves 401 and 402 matches or is in parallel with the plane between the drive shaft housing 102 and the lower unit casing 103. Referring to FIGS. 2 and 3, for example, the dividing plane between the upper and lower halves 401 and 402 matches the dividing plane between the drive shaft housing 102 and the lower unit casing 103. In this configuration, while the shift unit module 104 is assembled with the housing of the outboard motor 1, the upper part of the shift unit module 104 is housed in the drive shaft housing 102, and the lower part is housed in the lower unit casing 103. However, the dividing plane between the upper and lower halves 401 and 402 of the shift housing 40 may not necessarily match the dividing plane between the drive shaft housing 102 and the lower unit casing 103 unlike the aforementioned configuration. In addition, in the rear part of the shift housing 40, an oil pump housing cover 62 included in the oil pump housing 60 as a housing of the oil pump 6 is formed integratedly.

The upper gear 41 is provided in the lower end of the first input shaft 171 to rotate in synchronization with the first input shaft 171. For example, the upper gear 41 is splined to the lower end of the first input shaft 171. In addition, the upper gear 41 is rotatably supported by a bearing 412 (such as a radial ball bearing or a radial roller bearing) inside the upper half 401 of the shift housing 40. In addition, the upper gear 41 transmits, to the intermediate gear 42, the rotational power transmitted from the engine 13 via the first input shaft 171 at all times.

An oil passage 403 extending from the oil pump housing cover 62 to the upper part of the bearing 412 that rotatably supports the upper gear 41 is formed in the shift housing 40. The oil pump 6 feeds the oil to the upper part of the bearing 412 that rotatably supports the upper gear 41 through the oil passage 403.

The intermediate gear 42 is provided between the upper and lower gears 41 and 44 and meshes with them at all times. The intermediate gear 42 is rotatably supported by a bearing 421 (such as a tapered roller bearing) inside the shift housing 40. In addition, the intermediate gear 42 is arranged to extend in the front-rear direction behind the upper and lower gears 41 and 44 as seen in a side view or a top view such that its rotational axis is perpendicular to the rotational axes of the upper and lower gears 41 and 44.

An intermediate shaft 43 rotating in synchronization is coupled to the intermediate gear 42. The intermediate shaft 43 protrudes from the shift housing 40 to the rear side and transmits the rotational power to both the oil pump 6 and the water pump 7. In this manner, according to an embodiment of the present invention, the intermediate shaft 43 acts as a pump drive shaft for the oil pump 6 and the water pump 7.

The intermediate gear 42 and the upper gear 41 have different number of teeth, and the intermediate gear rotates at a speed different from that of the upper gear. The gear ratio between the intermediate gear 42 and the upper gear 41 is set depending on specifications of accessories driven by the intermediate shaft 43. That is, the gear ratio is set such that the intermediate shaft 43 has an appropriate rotation number depending on specifications of accessories driven by the intermediate shaft 43. In this manner, if the accessories are driven by the intermediate shaft 43, it is possible to easily set the rotation number of the intermediate shaft 43 suitably to drive the accessories by appropriately setting the gear ratio between the intermediate gear 42 and the upper gear 41.

In particular, if the oil pump 6 and the water pump 7 are employed as accessories as in this embodiment, the gear ratio between the intermediate gear 42 and the upper gear 41 is set such that the rotation number of the intermediate gear 42 (rotation number of the intermediate shaft 43) is greater than the rotation number of the upper gear 41 (rotation number of the first input shaft 171). For example, the number of teeth of the intermediate gear 42 is set to be smaller than that of the upper gear 41. As the rotation number of the intermediate shaft 43 acting as a pump drive shaft increases, the amount of oil or coolant output from the oil pump 6 or the water pump 7 increases. For this reason, by increasing the rotation number of the intermediate shaft 43, it is possible to miniaturize the oil pump 6 and the water pump 7 without reducing the output amount of oil or coolant. Therefore, by setting the gear ratio such that the rotation number of the intermediate gear 42 is greater than that of the upper gear 41, it is possible to reduce the size and weight of the shift unit module 104.

The lower gear 44 is arranged coaxially with the upper gear 41 under the upper gear 41 with a predetermined distance. The lower gear 44 is rotatably supported by a bearing 442 (such as a radial ball bearing or a radial roller bearing) inside the lower half 402 of the shift housing 40. The lower gear 44 receives the rotational power from the upper gear 41 via the intermediate gear 42 and rotates reversely to the upper gear 41.

The upper end of the second input shaft 172 protrudes to the gap between the upper and lower gears 41 and 44 through an axial bore of the lower gear 44. It is noted that a bearing 47 (such as a radial needle roller bearing) is provided between the axial bore of the lower gear 44 and the second input shaft 172 so that the lower gear 44 and the second input shaft 172 can rotate independently.

A dog clutch 45 is provided between the upper and lower gears 41 and 44. The dog clutch 45 is splined to, for example, the outer circumferential surface of the upper end of the second input shaft 172 so that it can rotate in synchronization with the second input shaft 172 and reciprocate in an axial line direction (vertically) on the second input shaft 172. Locking dogs 451 are formed on both upper and lower end surfaces of the dog clutch 45. In addition, locking dogs 411 and 441 are also formed on the lower surface of the upper gear 41 and the upper surface of the lower gear 44, respectively. In addition, as the dog clutch 45 moves upward, the locking dog 451 of the upper end surface of the dog clutch 45 is engaged with the locking dog 411 of the lower surface of the upper gear 41, so that the dog clutch 45 rotates in synchronization with the upper gear 41. Meanwhile, as the dog clutch 45 moves downward, the locking dog 451 of the lower end surface of the dog clutch 45 is engaged with the locking dog 441 of the upper surface of the lower gear 44, so that the dog clutch 45 rotates in synchronization with the lower gear 44. If the dog clutch 45 is placed in a center of the vertical movement range, the locking dogs 451 on both upper and lower end surfaces of the dog clutch 45 are not engaged with any one of the locking dogs 411 and 441 of the upper and lower gears 41 and 44. In this case, the rotational power of the first input shaft 171 is not transmitted to the second input shaft 172.

Since the intermediate gear 42 and the upper gear mesh with each other at all times, the rotational power of the engine 13 is transmitted to the intermediate shaft 43 via the upper gear 41 and the intermediate gear at all times regardless of the position of the dog clutch 45. In this manner, while the engine 13 is operated, and the first input shaft 171 rotates, it is possible to transmit the rotational power to the intermediate shaft 43 in a constant direction at all times regardless of whether or not the rotational power is transmitted to the second input shaft 172.

The shift actuating unit 5 is provided in front of the dog clutch 45 (that is, in front of the first and second input shafts 171 and 172). As illustrated in FIGS. 7 and 8, the shift actuating unit 5 includes a shift cam and a shift slider 52. The shift cam 51 is a cylindrical cam having a cam groove on its side surface. The shift cam 51 is connected to the lower end of the shift shaft 55 so that it rotates in the left-right direction by virtue of the rotational power transmitted via the shift shaft 55. The shift slider 52 is provided to reciprocate along the slide shaft 53. In addition, a part of the shift slider 52 is engaged with the cam groove of the shift cam 51 and protrudes to the rear side, and the shift slider 52 has an arm 521 engaged with the dog clutch 45. It is noted that the slide shaft 53 is supported by the shift housing 40 while its axial line is arranged in parallel with the first and second input shafts 171 and 172.

Furthermore, the outboard motor 1 has an actuator as a power source for driving the shift cam 51 and a shift shaft 55 for transmitting the drive power of the actuator 54 to the shift cam 51 as rotational power. The actuator 54 is provided, for example, in the inner or the lower surface of the engine cover 101. The shift shaft is rotatably inserted into the inside of the tubular pilot shaft 143 to extend vertically (refer to FIG. 2). In addition, the upper end of the shift shaft 55 is connected to the actuator 54, and the lower end is connected to the shift cam 51 of the shift actuating unit 5. Moreover, by actuating the actuator 54, it is possible to rotate the shift cam 51 in any one of the left and right directions.

The operation of the shift unit 4 will be described. As a ship operator operates the actuator 54, the shift shaft 55 rotates in any one of the left and right directions. As the actuator 54 is operated, the shift shaft 55 rotates in a direction corresponding to the direction of the rotational power generated by the actuator 54, so that the shift cam 51 rotates in synchronization with the shift shaft 55. As the shift cam 51 rotates, the shift slider 52 shifts the dog clutch 45 upward or downward depending on the rotation direction of the shift cam 51.

As the dog clutch 45 moves upward, the dog clutch is engaged with the upper gear 41, so that it rotates in synchronization with the upper gear 41. Since the dog clutch 45 rotates in synchronization with the second input shaft 172, the rotational power of the engine 13 is transmitted to the second input shaft 172 via the first input shaft 171, the upper gear 41, and the dog clutch 45. It is noted that, in this case, the second input shaft 172 rotates in the same direction as that of the first input shaft 171. Meanwhile, as the dog clutch 45 moves downward, the dog clutch 45 is engaged with the lower gear 44 so that it rotates in synchronization with the lower gear 44. For this reason, the rotational power of the engine 13 is transmitted to the second input shaft 172 via the first input shaft 171, the upper gear 41, the intermediate gear 42, the lower gear 44, and the dog clutch 45. In this case, the second input shaft 172 rotates reversely to the first input shaft 171. The rotational power transmitted to the second input shaft 172 is further transmitted to the rear propeller 12 via the pinion gear 18, the front gear 21, and the inner shaft 231, and is then transmitted to the front propeller via the pinion gear 18, the rear gear 22, and the outer shaft 232. In addition, if the dog clutch 45 is placed in the center of the vertical movement range, both the locking dogs 451 on the upper and lower ends of the dog clutch 45 are not engaged with the locking dogs 411 and 441 of the upper and lower gears 41 and 44. In this case, the rotational power output from the engine 13 is not transmitted to the second input shaft 172. Therefore, the shift position is set to a neutral position. In this manner, since the dog clutch 45 moves upward or downward by rotating the shift cam 51, it is possible to set the shift position to any one of forward, backward, and neutral positions.

According to the embodiment of the present invention, the shift position is set to the forward position when the locking dog 451 of the upper end of the dog clutch 45 is engaged with the locking dog 411 of the upper gear 41. Meanwhile, when the locking dog 451 of the lower end of the dog clutch 45 is engaged with the locking dog 441 of the lower gear 44, the shift position is set to the backward position. As a result, when the shift position is set to the backward position, the rotational power of the engine 13 is transmitted to the second input shaft 172 via the upper gear 41, the intermediate gear 42 and the lower gear 44. Typically, when the shift position is set to the backward position, the transmitted power is smaller than that of the forward position. For this reason, it is possible to weaken the strengths of the upper gear 41, the intermediate gear 42, and the lower gear 44. Therefore, it is possible to miniaturize these gears. Accordingly, it is possible to reduce the size and weight of the shift unit 4.

The shift unit 4 is provided with a position holding mechanism 56 for holding the shift position. The position holding mechanism 56 has, for example, three engagement concave portions 561 formed in the outer circumferential surface of the shift cam 51, an engagement member 562 removably fitted to the engagement concave portion 561, and a biasing member (not shown) for maintaining the state of the engagement member 562 fitted to the engagement concave portion 561. The engagement member 562 is provided reciprocatably with respect to the shift housing 40 and is biased to the outer circumferential surface of the shift cam 51 by a biasing member such as a spring. The three engagement concave portions 561 are provided to receive the fitted engagement member 562 in each of the forward, backward, and neutral positions. In this configuration, while no external force is applied to the shift cam 51, the engagement member 562 is held in a state fitted to any one of the engagement members 562. For this reason, the shift position is held. It is noted that, in order to change the shift position, the shift cam 51 is rotated by exerting a certain level of force by the actuator 54. Then, the engagement member 562 is released from the engagement concave portion 561 against the biasing force of the biasing member by virtue of the rotation of the shift cam 51. It is noted that, in order to implement such a function, the leading edge of the engagement member 562 (the portion fitted to the engagement concave portion 561) may be formed in a tapered shape, and a cross section of the engagement concave portion 561 perpendicular to the axial line of the shift cam 51 may have a "V" shape or a circular arc shape.

As described above, according to the embodiment of the present invention, the dog clutch 45 as a mechanism for controlling connection or disconnection of the rotational power is provided between the first and second input shafts 171 and 172. In this configuration, it is possible to facilitate miniaturization of the shift unit 4. That is, for example, if a friction clutch such as a cone clutch is used to transmit the rotational power of the engine 13, it is necessary to increase a pressing force for pressing the driven frictional surface toward the driving frictional surface and an area of the frictional surface in order to transmit high rotational power. This increases the size and weight of the shift unit 4. In particular, when a cone clutch is employed as the friction clutch, a dimension of the clutch in the axial line direction increases in order to enlarge the friction area. For this reason, if the shift unit 4 is provided under the lower mount bracket 146, in order to avoid interference between the shift unit 4 and the lower mount bracket 146, it is necessary to place the lower mount bracket 146 in a higher position and shorten the pilot shaft 143. In this case, the rigidity of the bracket device 14 may be reduced, and steering performance may be degraded disadvantageously.

In this regard, according to an embodiment of the present invention, the locking dog 451 of the dog clutch is engaged with the locking dogs 411 or 441 of the upper and lower gear 41 or 44. That is, the rotational power is transmitted without using a friction clutch. As a result, it is possible to miniaturize the dog clutch 45. In addition, since it is not necessary to apply a strong pressing force to the dog clutch 45 in the axial line direction, it is possible to miniaturize the shift actuating unit 5 for actuating the shift unit 4. Furthermore, a small-sized configuration can be applied to the actuator 54 and the like for rotating the shift shaft 55. Therefore, it is possible to reduce the size and weight of the shift unit 4.

<Accessories>

Next, a description will be made for the oil pump and the water pump 7 as examples of the accessories with reference to FIGS. 6 and 7. The oil pump 6 and the water pump 7 are operated by the rotational power transmitted from the intermediate shaft 43 by using the intermediate shaft 43 as a common pump drive shaft.

<Oil Pump>

According to an embodiment of the present invention, for example, a trochoid pump is employed as the oil pump 6. The oil pump 6 (trochoid pump) includes an oil pump housing 60, an inner rotor 64, an outer rotor 65, a pump body 63, and a bearing 66.

The oil pump housing 60 is a casing of the oil pump 6 and includes a pair of casing members, specifically, an oil pump housing body 61 and an oil pump housing cover 62. The oil pump housing body 61 has a cup or tray shape having an opened front side. The oil pump housing body 61 is internally provided with, from the front side, a space for housing the pump body 63 and a space for housing the bearing 66 (such as a cone roller bearing). In addition, the oil pump housing body 61 is provided with an oil intake port 611 for receiving oil from the outside and an oil discharge port 612 for discharging the oil to the outside. Furthermore, the oil pump housing body 61 has a through-hole penetrating in the front-rear direction to allow the intermediate shaft 43 to be inserted. The oil pump housing cover 62 is integratedly provided in the rear part of the shift housing 40 (upper and lower halves 401 and 402) of the shift unit 4. It is noted that the oil pump housing cover 62 covers the opening of the oil pump housing body 61. In addition, as described above, the oil pump housing cover 62 (upper half 401 of the shift housing 40) is provided with an oil passage 403 for feeding the oil to the inside of the shift housing 40. One end of the oil passage 403 is exposed to the rear face of the oil pump housing cover 62. As the oil pump housing body 61 is installed to the oil pump housing cover 62, the oil passage 403 communicates with the oil discharge port 612 of the oil pump housing body 61. It is noted that any configuration may be employed as the oil pump housing cover 62 without a particular limitation if it can block the opening of the oil pump housing body 61.

A circular concave portion is formed on the front surface side of the pump body 63 as seen in a front view. This concave portion can rotatably house the outer rotor 65 and the inner rotor 64. A through-hole penetrating in the front-rear direction to receive the inserted intermediate shaft 43 is formed on the bottom of the circular concave portion in a decentered position. Furthermore, an oil intake hole 631 and an oil discharge hole 632 are formed on the bottom of the concave portion.

The inner rotor 64 has a plurality of triangular teeth bulging to the outside of the radial direction with a predetermined thickness. The inner rotor 64 is provided with an axial bore penetrating in the front-rear direction (thickness direction) and receiving the inserted intermediate shaft 43. The outer rotor 65 has a circular shape, as seen in a front view, with a predetermined thickness. The outer rotor 65 has an opening penetrating in the front-rear direction (thickness direction), and a plurality of triangular teeth bulging to the inside of the radial direction are formed on the inner circumferential surface of the opening. It is noted that the number of teeth formed in the outer rotor 65 is greater than the number of teeth formed in the inner rotor 64.

An assembly structure of the oil pump 6 will be described. The bearing 66 and the pump body 63 are housed in the oil pump housing body 61. It is noted that the pump body 63 is housed so as not to rotate with respect to the oil pump housing body 61. As the pump body 63 is housed in the concave portion of the oil pump housing body 61, the oil intake hole 631 and the oil discharge hole 632 of the pump body 63 communicate with the oil intake port 611 and the oil discharge port 612, respectively, of the oil pump housing body 61. It is noted that one end of the oil intake pipe 67 is connected to the oil intake port 611. The other end of the oil intake pipe 67 reaches the front side of the second input shaft 172 inside the lower unit casing 103. The outer rotor 65 is rotatably housed in a circular concave portion provided in the pump body 63. The inner rotor 64 is housed in the opening provided in the outer rotor 65. In addition, the oil pump housing body 61 is fixed to the oil pump housing cover 62 formed in the rear part of the shift housing 40 with a bolt and the like. In addition, the oil pump housing body 61 is covered by the oil pump housing cover 62. As a result, the inner rotor 64 and the outer rotor 65 are rotatably housed in the space formed by the oil pump housing body 61 and the shift housing 40.

The oil discharge port 612 of the oil pump housing body 61 communicates with the oil passage 403 formed in the oil pump housing cover 62 (upper half 401 of the shift housing 40). In addition, while the oil pump 6 is assembled to the shift unit 4, the intermediate shaft 43 penetrates the axial bore of the inner rotor 64, the through-hole of the pump body 63, the bearing 66, and the opening of the oil pump housing body 61 and then protrudes to the rear side. It is noted that the inner rotor 64 is coupled to the intermediate shaft 43 with a key and the like so that they rotate in synchronization. In addition, since the through-hole of the pump body 63 is decentered from the circular concave portion, the inner rotor 64 is also decentered from the outer rotor 65.

In this manner, the oil pump housing body 61 and the oil pump housing cover 62 constitute the oil pump housing 60. In addition, the oil pump housing cover 62 is formed integratedly with the shift housing 40. In this configuration, it is not necessary to separately provide an independent oil pump housing cover. In addition, the oil passage 403 extending from the oil pump to the upside of the bearing 412 that rotatably supports the upper gear 41 can be formed integratedly with the shift housing 40. Therefore, it is possible to miniaturize the shift unit module 104 and simplify the structure of the shift unit module 104.

The operation of the oil pump 6 will be described. As the rotational power of the engine 13 is transmitted to rotate the intermediate shaft 43, the inner rotor 64 rotates in synchronization with the intermediate shaft 43. A part of the teeth of the inner rotor 64 mesh with the teeth of the outer rotor 65. Therefore, as the inner rotor 64 rotates, the outer rotor 65 also rotates. Since the inner rotor 64 is decentered from the outer rotor 65, and they have different number of teeth, a volume of the gap formed between the inner rotor 64 and the outer rotor 65 changes depending on a circumferential position of the gap as they rotate. In addition, the oil intake hole 631 of the pump body 63 is formed in a position where the volume of this gap starts to increase, and the oil discharge hole 632 is formed in a position where the volume of the gap starts to decrease after it is maximized. For this reason, as the inner rotor 64 and the outer rotor 65 rotate along with the rotation of the intermediate shaft 43, the oil retained in the lower unit casing 103 is suctioned through the oil intake pipe 67 and the oil intake port 611 and is discharged from the oil discharge port 612. In addition, the suctioned oil is discharged to the upper side of the bearing 412 that rotatably supports the upper gear 41 through the oil passage 403 formed in the upper half 401 of the shift housing 40. The discharged oil lubricates the bearing 412, and then flows down while it lubricates each member provided in the shift housing 40. Furthermore, the oil flows along the outer circumference of the second input shaft 172 and reaches the inside of the lower unit casing 103. In this manner, the oil pump 6 can feed the oil to the shift unit 4 of the outboard motor 1 for lubrication.

<Water Pump>

According to an embodiment of the present invention, for example, the water pump 7 has a multiblade rotor 73 (impeller). The water pump 7 includes a water pump housing body 71, a water pump housing cover 72, a multiblade rotor 73, and a panel member 74.

The water pump housing body 71 and the water pump housing cover 72 constitute a housing of the water pump 7. The water pump housing body 71 is opened in its front side and has a circular concave portion as seen in a front view. In addition, this circular concave portion acts as a rotor housing chamber for rotatably housing the multiblade rotor 73. In addition, the water pump housing body 71 is provided with a coolant discharge port 711 for discharging the coolant from the internal space to the outside. The water pump housing cover 72 is a member for covering the front side of the water pump housing body 71. The water pump housing cover 72 is provided with a through-hole that can receive the inserted intermediate shaft 43 and a coolant intake port 721 for suctioning the coolant from the outside. The multiblade rotor 73 has a plurality of elastically deformable blades extending to the outside in a radial direction. The panel member 74 is provided with a through-hole that can receive the inserted intermediate shaft 43 and a coolant intake hole 741 where the coolant passes.

An assembly structure of the water pump 7 will be described. The multiblade rotor 73 is rotatably housed in the rotor housing chamber of the water pump housing body 71. In this state, leading edges of the blades of the multiblade rotor 73 make contact with the inner circumferential surface of the rotor housing chamber. In addition, the multiblade rotor 73 is coupled to the rear end of the intermediate shaft 43 so that it rotates in synchronization with the intermediate shaft 43. It is noted that a rotation center of the multiblade rotor 73 is decentered upward from the center of the circular rotor housing chamber. In addition, the panel member 74 is arranged in front of the water pump housing body 71, and the water pump housing cover 72 is further arranged in front of the panel member 74. Gaskets 75 are interposed between the panel member 74, the water pump housing body 71, and the water pump housing cover 72. In addition, the water pump housing body 71 and the water pump housing cover 72 are coupled to each other by a bolt and the like. In this case, the panel member 74 or the gasket 75 is also fixed by a bolt and the like at the same time.

The operation of the water pump 7 will be described. As the intermediate shaft 43 rotates by virtue of the rotational power from the engine 13, the multiblade rotor 73 rotates in synchronization with the intermediate shaft 43. Since the multiblade rotor 73 is decentered upward, a volume of the space formed by the blades of the multiblade rotor 73 and the inner circumferential surface of the rotor housing chamber is reduced as the multiblade rotor 73 rotates and moves upward. In addition, the volume of this space increases as the multiblade rotor 73 moves downward. In addition, the inlet hole of the panel member 74 is decentered, as seen in a front view, downward from the center of the intermediate shaft 43. Meanwhile, the coolant discharge port 711 is formed on top of the water pump housing body 71. For this reason, the water pump 7 can suction the coolant from the coolant intake port 721 and discharge it from the coolant discharge port 711.

As the shift unit module 104 is assembled to the outboard motor 1, the coolant intake port 721 of the water pump 7 communicates with a lower coolant passage 262 of the lower unit casing 103, and the coolant discharge port 711 is connected to an upper coolant passage 261. For this reason, if the multiblade rotor 73 rotates as the intermediate shaft 43 rotates, the water pump 7 receives the coolant from the outside through the water inlet port of the lower unit casing 103, the lower coolant passage 262, and the coolant intake port 721. In addition, the water pump 7 feeds the coolant to the engine 13 through the coolant discharge port 711 and the upper coolant passage 261 of the drive shaft housing 102.

As described above, according to an embodiment of the present invention, the oil pump 6 is arranged in rear of the shift unit 4, and the water pump 7 is arranged in rear of the oil pump 6. The oil pump 6 and the water pump 7 are arranged coaxially along the front-rear direction, and the intermediate shaft 43 acts as a common pump drive shaft. As described above, the intermediate shaft 43 is arranged to rotate in synchronization with the intermediate gear 42. For this reason, while the engine 13 is operated, and the crankshaft rotates, the intermediate shaft 43 rotates in a constant direction at all times regardless of the shift position of the shift unit 4. Therefore, the oil pump 6 and the water pump 7 are operated continuously while the first input shaft 171 rotates.

It is notated that, although the aforementioned configuration includes, for example, the oil pump 6 and the water pump 7, the present invention is not limited thereto. Any configuration may be employed if the oil pump 6 and the water pump 7 can be operated by the rotational power transmitted from the outside through a common intermediate shaft 43.

Since the shift unit 4, the oil pump 6, and the water pump 7 are modularized in an integrated manner, a work for assembling them to the outboard motor 1 is easy in a production line. In addition, it is possible to simplify the production line of the outboard motor 1 and reduce the manufacturing cost. Furthermore, since they can be checked or exchanged in a modularized state, it is possible to improve quality.

The upper gear 41 and the intermediate gear 42 mesh with each other at all times, and the rotational power is transmitted to the intermediate shaft 43 at all times during the operation of the engine 13. For this reason, during the operation of the engine 13, it is possible to operate the oil pump 6 and the water pump 7 by rotating the intermediate shaft 43 in a constant direction at all times regardless of the shift position of the shift unit 4. In addition, in this configuration, it is possible to achieve miniaturization, compared to a configuration in which the water pump 7 is directly provided in the first input shaft 171. That is, the amount of the coolant discharged by the water pump 7 increases as the rotation number of the multiblade rotor 73 increases. As described above, the gear ratio between the intermediate gear 42 and the upper gear 41 is set such that the rotation number of the intermediate shaft is greater than that of the first input shaft 171. For this reason, when the water pump 7 is operated by using the intermediate shaft 43 as a pump drive shaft, it is possible to achieve miniaturization without reducing the amount of the discharged coolant, compared to a case where the first input shaft 171 is used as a pump drive shaft.

Since the shift unit 4, the oil pump 6, and the water pump 7 are modularized, it is possible to achieve miniaturization in the entire structure. In particular, since the oil pump housing cover 62 is integrated to the rear part of the shift housing 40 of the shift unit 4, it is possible to miniaturize the oil pump 6.

According to the embodiment of the present invention, since the water pump 7 as an accessory is provided in rear of the shift unit 4, it is possible to simplify the configuration around the first input shaft 171. For this reason, it is possible to reduce a distance between the first input shaft 171 and the pilot shaft 143. For example, when the water pump 7 is provided coaxially with the first input shaft 171, it is necessary to increase a distance between the first input shaft 171 and the pilot shaft 143 or arrange the water pump 7 over or under the pilot shaft 143 in order to avoid interference between the water pump 7 and the pilot shaft 143. However, in the former configuration, since the moment of inertia in rotation of the pilot shaft 143 of the outboard motor 1 increases, the steering performance is degraded. Furthermore, the center of the outboard motor 1 recedes from a ship hull, gliding performance (acceleration performance) is degraded. Meanwhile, in the latter configuration, it is necessary to shorten the pilot shaft 143. Therefore, the rigidity of the bracket device 14 is lowered, and the steering performance is degraded.

In comparison, according to the embodiment of the present invention, since the water pump 7 is provided in rear of the first input shaft 171, no interference is generated between the water pump 7 and the pilot shaft 143. For this reason, it is possible to reduce the distance between the pilot shaft 143 and the drive shaft 17. In this configuration, it is possible to reduce the moment of inertia in the rotation of the pilot shaft 143 of the outboard motor 1 and allow the center of the outboard motor 1 to approach the ship hull. Therefore, it is possible to improve steering performance and gliding performance. In addition, since accessories such as the water pump 7 are not arranged over the shift unit 4, it is possible to allow the lower mount bracket 146 that supports the lower end of the pilot shaft 143 to be close to the shift unit 4. For this reason, it is possible to improve the rigidity of the bracket device 14 by lengthening the pilot shaft 143 and improve steering performance. Furthermore, since the shift unit 4 is arranged under the lower mount bracket 146, it is possible to prevent interference between the shift unit 4 and the pilot shaft 143 and allow the pilot shaft 143 and the drive shaft 17 to be close to each other. This contributes to miniaturization.

When the water pump 7 is provided in rear of the shift unit 4, it is possible to lower the arrangement position of the water pump 7 to be close to the water surface, compared to the configuration in which the water pump 7 is provided in the first input shaft 171. For this reason, it is possible to improve pump efficiency of the water pump 7. It is noted that the shift unit module 104 including the water pump 7 is positioned higher than the cavitation plate 105, as seen in a side view, where it is not submerged under the water during the use. Therefore, there is no need to worry about an increase of water resistance that may be caused when the submerged portion of the lower unit casing 103 increases.

When the water pump 7 is provided in rear of the oil pump 6, maintainability of the water pump 7 is improved. The water pump 7 may suction a foreign object such as sand along with the coolant in some times. For this reason, it is necessary to perform periodic maintenance due to wear of the multiblade rotor 73 and the like. In comparison, since the oil pump 6 does not suction a foreign object, maintenance frequency is reduced, compared to the water pump 7. In this regard, since the water pump 7 is provided in rear of the oil pump 6, it is possible to perform maintenance of the water pump 7 (in particular, inspection of the multiblade rotor 73 and the like) without removing or disassembling the oil pump 6. Therefore, it is possible to improve maintainability of the water pump 7.

Figure 9:
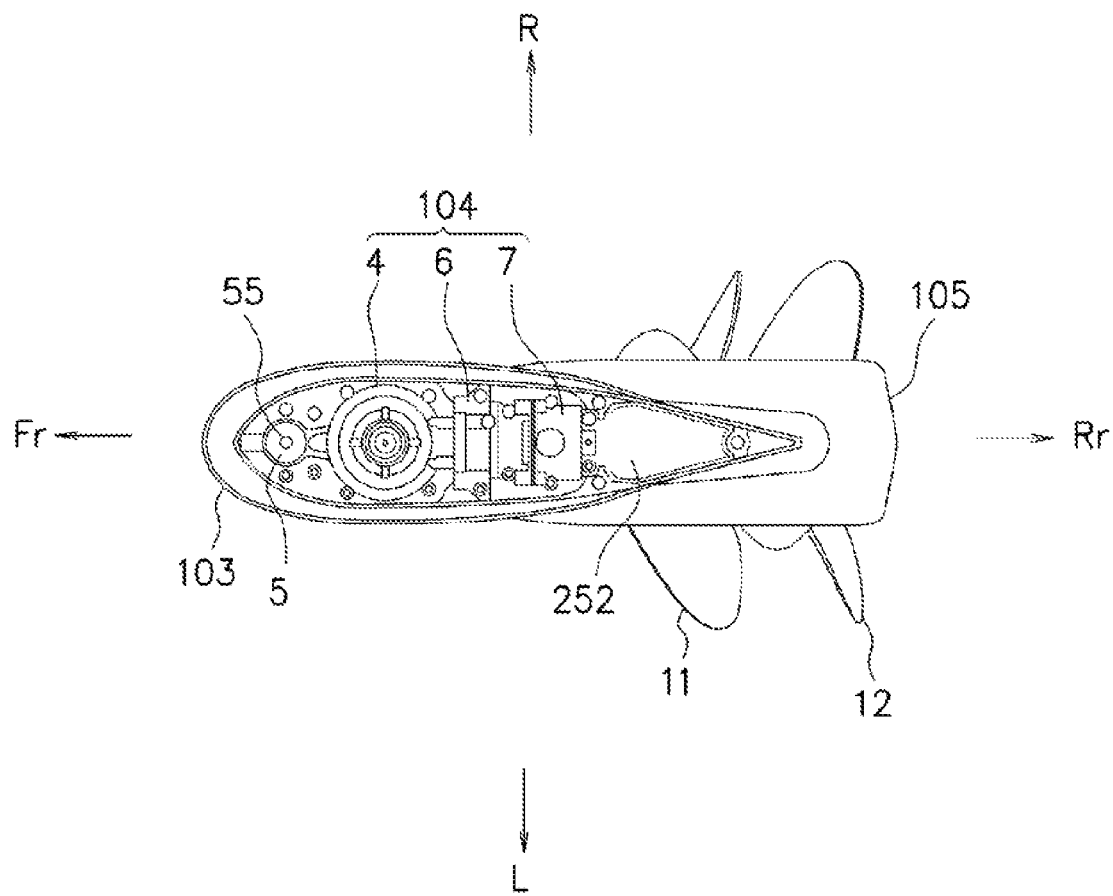
FIG. 9 is a diagram illustrating the lower unit casing as seen from the upside.

FIG. 9 is a top plan view illustrating a state that the lower unit casing 103 is removed from the drive shaft housing 102. The shift unit 4, the oil pump 6, and the water pump 7 are fixed to the lower unit casing 103 by a bolt and the like. For this reason, when the lower unit casing 103 is removed from the drive shaft housing 102, the shift unit module 104 is separated from the drive shaft housing 102 along with the lower unit casing 103. As illustrated in FIG. 9, the rear part of the water pump 7 faces the exhaust passage 25 to form a space where nothing is arranged. In this manner, since the water pump 7 is provided to face the exhaust passage 25, and there is a space in its vicinity, it is possible to facilitate maintenance of the water pump 7. For example, it is possible to facilitate installation or uninstallation of the water pump 7.

Next, a description will be made for main functional effects of the outboard motor according to the embodiment of the present invention described above.

First, compared to an outboard motor of the prior art in which the forward/backward switching mechanism is arranged in the gear casing, the forward/backward switching mechanism is arranged inside the drive shaft housing. Therefore, only a driving unit of the contra-rotating propellers is included in the gear casing of the lower unit. As a result, it is possible to miniaturize the lower unit and reduce a water stream resistance during a travel. In addition, since the switching between the forward and backward travel is performed by using the dog clutch, it is possible to obtain a simple and light-weight mechanism, compared to the friction clutch which has a large size and a heavy weight.

In the friction clutch, a transfer torque is obtained by pressing the driven-side frictional surface to the driving-side frictional surface. However, as the transfer torque increases, the stronger pressing force (load in the thrust direction) and the wider frictional surface are necessary. In order to reliably obtain the stronger pressing force and the wider frictional surface, the corresponding device inevitably has a large size and a heavy weight. According to the present invention, since the dog clutch is employed, it is possible to suitably and smoothly perform the clutch operation without necessity of such a pressing force and employ a small-sized actuator.

Instead of the gear casing of the prior art in which the forward/backward switching mechanism is submerged under the water, the forward/backward switching mechanism is arranged in the drive shaft housing over the cavitation plate exposed on the water surface. Therefore, only a contra-rotating propeller driving device is housed in the gear casing. As a result, it is possible to achieve miniaturization and remarkably reduce the water stream resistance.

In this case, the forward/backward switching mechanism is arranged under the upper and lower mount portions. Therefore, it is possible to arrange the drive shaft, that is, the main body of the outboard motor to be close to the steering shaft. As a result, it is possible to improve steering performance by reducing the moment of inertia around the steering shaft and arrange the center of the outboard motor to be close to the ship hull. Therefore, it is possible to improve gliding (acceleration) performance.

Furthermore, in a cone clutch, in order to obtain a predetermined level of the frictional coefficient, the axial length of the clutch body increases, that is, the vertical length increases, compared to the dog clutch. Therefore, it is necessary to reduce the span between the upper and lower mount portions in order to arrange the steering shaft mount portion over the forward/backward switching mechanism. As a result, the support rigidity of the outboard motor is reduced. This remarkably affects controllability or stability of a ship in this state.

Since the intermediate shaft can have a rotation speed higher than that of the first input shaft and rotate in a constant direction at all times, this effectively contributes to miniaturization, compared to a case where a fluid pump is directly driven by the first input shaft.

In addition, it is possible to arrange the coolant pump in the lateral side of the forward/backward switching mechanism close to the water surface, compared to a case where the coolant pump is arranged over the forward/backward switching mechanism for the driving operation by the first input shaft. Therefore, it is possible to improve the pump efficiency. It is noted that a pump typically employed in an outboard motor has low pump-up performance.

Furthermore, since a lubricant pump for the forward/backward switching mechanism can be arranged integratedly with the forward/backward switching mechanism, it is possible to achieve miniaturization in the entire structure.

Figure 10:
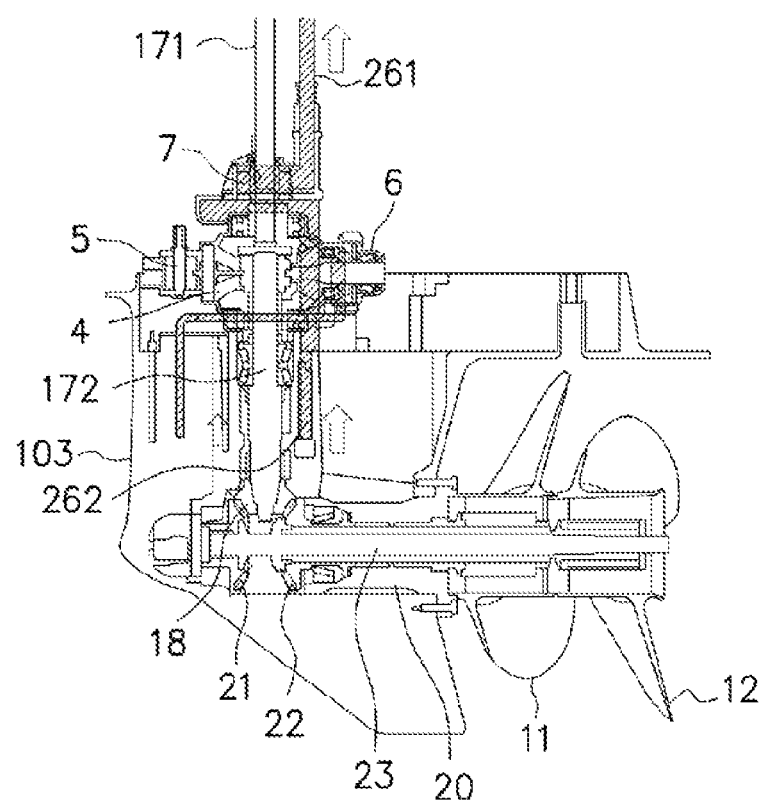
FIG. 10 is a cross-sectional view illustrating an exemplary configuration of the surrounding of the shift unit module according to a modification of the present invention.

Here, FIG. 10 illustrates a modification of the present invention, specifically, another exemplary arrangement of the water pump 7. In this modification, the water pump 7 is provided on the first input shaft 171, and the water pump 7 is driven by the rotational power of the first input shaft 171.

As illustrated in FIG. 10, the water inlet port of the water pump 7, the lower coolant passage 262, and the upper coolant passage 261 are piped vertically in an approximately straight line along the vicinities of the first input shaft 171 and the second input shaft 172. Since they are not piped to go around through the oil pump 6, it is possible to simplify the pipes and effectively improve the pump efficiency.

While the embodiments of the present invention have been described hereinbefore in detail with reference to the accompanying drawings, it would be appreciated that they are merely intended to illustrate specific examples of the present invention and are not intended to limit the scope of the invention. Instead, various changes or modifications can be possible without departing from the spirit and scope of the present invention.

For example, although an outboard motor having contra-rotating propellers has been described by way of example in the aforementioned embodiment, the present invention may effectively apply to an outboard motor having a single propeller. In this case, it is also possible to obtain the effects similar to those of the aforementioned embodiment.

INDUSTRIAL APPLICABILITY

According to the present invention, the forward/backward switching mechanism is arranged inside the drive shaft housing, and only the propeller driving device is included in the gear casing of the lower unit. Therefore, it is possible to miniaturize the lower unit and reduce a water stream resistance during a travel. In addition, since the switching between the forward and backward operations is performed by using the dog clutch, it is possible to obtain a simple and light-weight mechanism, compared to a friction clutch which has a large size and a heavy weight.

The invention claimed is:

1. An outboard motor comprising:
a drive shaft extending in a vertical direction to transmit engine power;
a pinion bevel gear installed in a lower end of the drive shaft to rotate in synchronization;
a driven bevel gear meshing with the pinion bevel gear;
a propeller shaft rotatably driven by the driven bevel gear; and
a propeller installed in a rear end of the propeller shaft to rotate in synchronization,
wherein the drive shaft includes a first input shaft rotated by an engine, and a second input shaft arranged coaxially with the first input shaft to receive rotation transmitted from the first input shaft,
a forward/backward switching mechanism is interposed between the first and second input shafts, the forward/backward switching mechanism including
a clutch body supported to rotate in synchronization with the second input shaft,
an upper gear rotated by the first input shaft,
a lower gear rotated reversely to the upper gear, and
an intermediate gear interposed between the upper and lower gears and supported by an intermediate shaft perpendicular to the drive shaft,
the clutch body is a dog clutch having upper and lower locking dogs and moving along an axial direction of the second input shaft, and
rotation of the first input shaft is transmitted to the second input shaft forwardly or reversely by engaging the dog clutch with the upper or lower gear.

2. The outboard motor according to claim 1, wherein the forward/backward switching mechanism is arranged under upper and lower mount portions for holding upper and lower ends of a steering shaft that supports the outboard motor pivotably to the left or the right, and at least the lower gear is arranged over a cavitation plate provided in an upper part of the lower unit.

3. The outboard motor according to claim 2, wherein a shift actuating unit of the forward/backward switching mechanism for moving the dog clutch upward or downward is arranged in front of the drive shaft, the intermediate gear and the intermediate shaft are arranged in rear of the drive shaft, and an accessory of the outboard motor is driven by the intermediate shaft.

4. The outboard motor according to claim 3, wherein the accessory includes any one or both of a coolant pump for cooling the engine and a lubricant pump of the forward/backward switching mechanism.

5. The outboard motor according to claim 4, wherein the lubricant pump is arranged in front of the coolant pump.

6. The outboard motor according to claim 1, wherein a shift actuating unit of the forward/backward switching mechanism for moving the dog clutch upward or downward is arranged in front of the drive shaft, the intermediate gear and the intermediate shaft are arranged in rear of the drive shaft, and an accessory of the outboard motor is driven by the intermediate shaft.

7. The outboard motor according to claim 6, wherein the accessory includes any one or both of a coolant pump for cooling the engine and a lubricant pump of the forward/backward switching mechanism.

8. The outboard motor according to claim 7, wherein the lubricant pump is arranged in front of the coolant pump.

\* \* \* \* \*